(12) United States Patent
Mynes

(10) Patent No.: US 7,024,794 B1
(45) Date of Patent: Apr. 11, 2006

(54) CENTRIFUGAL PELLET DRYER WITH PLASTIC WALL PANELS

(75) Inventor: Jeffrey S. Mynes, Huntington, WV (US)

(73) Assignee: Gala Industries, Eagle Rock, VA (US)

( * ) Notice: Subject to any disclaimer, the term of this patent is extended or adjusted under 35 U.S.C. 154(b) by 0 days.

(21) Appl. No.: 10/964,832

(22) Filed: Oct. 15, 2004

(51) Int. Cl.
*F26B 17/24* (2006.01)

(52) U.S. Cl. ............................ 34/59; 34/172; 34/182; 34/183; 210/374

(58) Field of Classification Search ................ 34/59, 34/172, 182, 183; 210/374, 377
See application file for complete search history.

(56) References Cited

U.S. PATENT DOCUMENTS

| | | | |
|---|---|---|---|
| 3,458,045 A | 7/1969 | Dudley | |
| 4,476,019 A | 10/1984 | Nowisch et al. | |
| 4,565,015 A | 1/1986 | Hundley, III | |
| 4,570,359 A | 2/1986 | Rudolph | |
| 4,896,435 A | 1/1990 | Spangler, Jr. | |
| 5,074,057 A | 12/1991 | Kanai | |
| 5,187,880 A | 2/1993 | Rudolph | |
| 5,197,205 A | 3/1993 | Spada et al. | |
| 5,265,347 A | 11/1993 | Woodson et al. | |
| 5,333,396 A | 8/1994 | Kanai | |
| 5,611,150 A | 3/1997 | Yore, Jr. | |
| 5,638,606 A | 6/1997 | Bryan et al. | |
| 5,987,769 A | 11/1999 | Ackerman et al. | |
| 6,138,375 A | 10/2000 | Humphries, II et al. | |
| 6,237,244 B1 | 5/2001 | Bryan et al. | |
| 6,807,748 B1 * | 10/2004 | Bryan et al. ................ | 34/108 |
| 6,938,357 B1 * | 9/2005 | Hauch ........................ | 34/168 |

FOREIGN PATENT DOCUMENTS

| | | |
|---|---|---|
| DE | 33 28 303 C1 | 11/1984 |
| DE | 43 38 030 C1 | 11/1994 |

* cited by examiner

*Primary Examiner*—S. Gravini
(74) *Attorney, Agent, or Firm*—Jacobson Holman PLLC

(57) ABSTRACT

A centrifugal pellet dryer including a stationary cylindrical screen, a driven elevating rotor in said screen elevating wet pellets inside the screen and imparting radial forces to the wet pellets to impact them against the interior of the screen to enable moisture on the pellets to be separated and discharged through the screen, a housing enclosing the screen and rotor and including an inlet for a slurry of pellets, an outlet for dried pellets and an outlet for water removed from the pellets. The side walls of the housing are constructed of a plurality of relatively large, flat panels made of plastic sheet material are supported in a metal framework to attenuate noise of the dryer produced by rotation of the drier rotor and impact of the wet pellets against the screen. A dewaterer in advance of the dryer also has walls made of plastic sheet material.

23 Claims, 13 Drawing Sheets

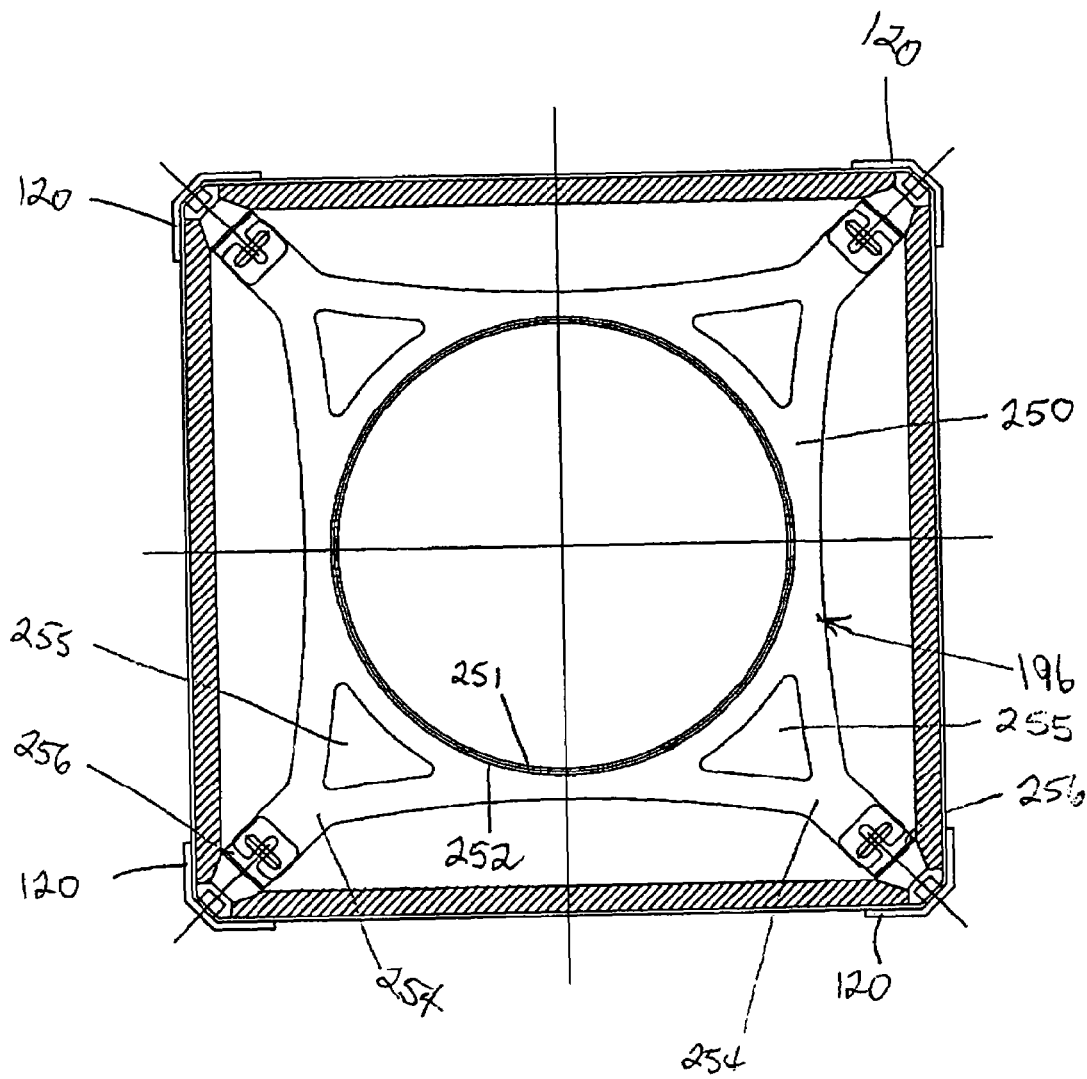

CENTRIFUGAL PELLET DRYER WITH PLASTIC WALL PANELS

BACKGROUND OF THE INVENTION

1. Field of the Invention

The present invention generally relates to centrifugal pellet dryers of the type in which a driven rotor impacts wet pellets exiting an underwater pelletizer against the interior surface of a cylindrical screen which allows water to pass therethrough and the pellets to continue upwardly inside the screen to a discharge outlet. More specifically, the present invention is directed to such a centrifugal pellet dryer in which the housing walls are made of a plastic sheet material to attenuate the noise produced by the centrifugal dryer.

2. Description of the Prior Art

Centrifugal pellet dryers have been effectively used to separate water and moisture from pellets, such as those formed by an underwater pelletizer in which the pellets and water are discharged from the pelletizer cutting chamber as a water and pellet slurry. The water and pellet slurry exiting the pelletizer is typically fed first through a dewatering screen chamber or other suitable water separating equipment to remove the bulk water from the slurry before entering the centrifugal dryer.

Existing centrifugal pellet dryers include an outer housing usually constructed of sheet metal panels, a cylindrical screen oriented in the housing and a driven rotor within the screen for elevating the wet pellets (and entrained water) and impacting the wet pellets against the interior of the screen for separating the water from the pellets so that the water can be discharged through the screen and fall by gravity to a water outlet. The dried pellets are elevated and discharged from an outlet in the area of the upper end of the housing. Existing dewaterers are also constructed with sheet metal panels.

Centrifugal pellet dryers of this general type including a dewatering component are disclosed in the following U.S. patents owned by Gala Industries, Inc. ("Gala"), the assignee of this application: U.S. Pat. Nos. 3,458,045; 4,565,015; 4,896,435; 5,265,347; 5,638,606; 6,138,375 and 6,237,244.

Centrifugal pellet dryers of this type operate on the principle of impact dewatering by utilizing a driven rotor oriented internally of a stationary cylindrical screen with energy being imparted to the wet pellets (and entrained water) by the rotor. The rotor includes peripheral inclined blades to lift the wet pellets (and entrained water) vertically upwardly inside the screen and also to impact the wet pellets (and entrained water) radially against the interior of the screen with moisture being separated from the pellets and discharged through the screen into the interior of the housing.

Centrifugal dryers of this type are quite effective in removing water and moisture from the pellets with the residual heat from the pellets from the pelletization operation further drying the pellets as they are discharged from the upper end of the dryer. Operation of centrifugal pellet dryers of this type, however, produce noise levels that can be objectionable to personnel in the vicinity of the dryers. U.S. Pat. No. 5,265,347 discloses a dryer of this type which is constructed to reduce outward transmission of noise to surrounding areas by constructing the housing with double walls and insulation filling the space between the walls and, preferably, the top and bottom panels of the housing.

SUMMARY OF THE INVENTION

In order to address the problem of high noise levels associated with existing centrifugal pellet dryers, the walls of the pellet dryer housing of the present invention are constructed of substantially flat plastic panels having sufficient thickness to significantly reduce the noise level caused by operation of the centrifugal dryer. The plastic panel walls are supported in a support framework made of a suitable metal, such as stainless steel and/or aluminum, or other material which is rigid and strong enough to support the operational components of the dryer. The rigid support framework includes generally horizontal top and bottom sections which are interconnected by a series of vertical corner frame members to form the rigid support framework.

The vertical side edges of the plastic wall panels are sealingly interconnected to provide a substantially rigid plastic wall assembly, and the top and bottom sections receive the top and bottom edges of the side walls around their periphery to form a watertight housing. It has been surprisingly found that such a plastic wall housing will substantially reduce outward transmission of noise produced by the movement of the wet pellets and components of the dryer and the impact of the wet pellets against the interior of the separating screen.

The vertical corner frame members of the support framework are connected to the vertical side edges of the plastic wall panels to support and further rigidify the housing. In a preferred embodiment, the vertical side edges of the plastic wall panels are clamped to the metal corner frame members by corner seal strips bolted to the inside of the vertical corner frame members. The frame members extend below the support framework bottom section to support the housing above a support surface and can extend above the support frame top section to provide structure by which the dryer can be lifted and transported by lift devices engaged with the upper end of the frame members.

The plastic wall panels are all preferably made from the same plastic sheet material. It has been found that plastic sheet approximately one inch thick is satisfactory for the housing walls of the present invention to significantly reduce the noise levels when operating a centrifugal pellet dryer of the rotating rotor, impact screen type and to aid in providing a requisite rigidity for the overall housing. It is believed that the plastic sheet for use in constructing the plastic wall panels in accordance with the present invention should be at least three-quarters inch thick to provide the necessary noise attenuation and housing strength and no more than two inches thick due to cost and weight considerations. The plastic material for the present invention can be any suitable polymeric material with or without fiber reinforcement. A preferred material is polypropylene.

A dewatering screen chamber is preferably integral with the plastic housing centrifugal pellet dryer for initially receiving the pellet and water slurry and removing a major portion of the water in advance of the centrifugal dryer. In the preferred embodiments the bottom section of the dryer is formed with the bottom of the dewatering chamber as one piece, and the side walls and top wall of the dewaterer are all preferably constructed of the same plastic sheet material as the dryer housing wall panels. The dewaterer housing walls are preferably welded together to form a watertight unit.

Because the top and bottom sections and plastic side wall panels are all supported by the vertical corner frame members, the pellet dryer of this invention is "modular" in the sense that the top section can be rotated and the plastic side wall panels shifted during assembly without fabrication modifications. This modular flexibility allows the user to select the best position of these components for the user's facility.

Accordingly, it is an object of the present invention to provide a centrifugal pellet dryer having housing walls constructed of plastic sheet material to attenuate the noise produced by operation of the centrifugal pellet dryer to an acceptable level.

Another object of the present invention is to provide a centrifugal pellet dryer housing having side walls constructed of generally flat panels of plastic sheet material, preferably polypropylene, to reduce or break up sound wave transmission from the housing.

A further object of the present invention is to provide a centrifugal pellet dryer having a housing with side walls constructed of sound-attenuating plastic material, preferably in the form of generally flat panels, supported in a metal support framework for providing structural integrity to the housing and for supporting the operational components of the dryer.

Yet another object of the present invention is to provide a centrifugal pellet dryer with plastic sheet panel side walls supported in a metal framework including top and bottom sections which receive and surround the top and bottom edges, respectively, of the wall panels and vertical corner frame members which connect to the side edges of the wall panels to form a rigid and sealed watertight dryer housing assembly.

Still another object of the present invention is to provide centrifugal pellet dryer housing walls of plastic material which reduce the noise level to an average of below about 80 decibels (Dba) at points located centrally of and 36 inches away from each of the walls of the dryer as compared to 90 or more decibels (Dba) produced by a centrifugal pellet dryer having conventional metal walls under the same operating conditions.

Still a further object of the present invention is to provide a dewatering screen chamber integral with the centrifugal pellet dryer for capturing a majority of the water from the pellet and water slurry in advance of the dryer in which the walls of the dewatering chamber are also made from the same plastic sheet material as the side walls of the centrifugal dryer.

A further object of the present invention is to provide a centrifugal pellet dryer including top and bottom sections and plastic sheet panel side walls all supported by vertical corner frame members in which the top section can be rotated and the position of the plastic side wall panels selected for modular flexibility.

Still yet another object of this invention to be specifically enumerated herein is to provide a centrifugal pellet dryer in accordance with the preceding objects which will conform to conventional forms of manufacture, be of simple construction and easy to operate so as to provide a dryer that will be economically feasible, long lasting and relatively trouble free in operation.

These together with other objects and advantages which will become subsequently apparent reside in the details of constructions and operation as more fully hereinafter described and claimed, reference being had to the accompanying drawings forming a part hereof, wherein like numerals refer to like parts throughout. The drawings are intended only to illustrate the present invention and should not be considered to scale.

BRIEF DESCRIPTION OF THE DRAWINGS

FIG. 15 is a top plan view of the support ring for holding and supporting adjacent edges of screen sections inside the dryer housing for the pellet dryer of FIG. 10.

DESCRIPTION OF THE PREFERRED EMBODIMENT

Figure 1:
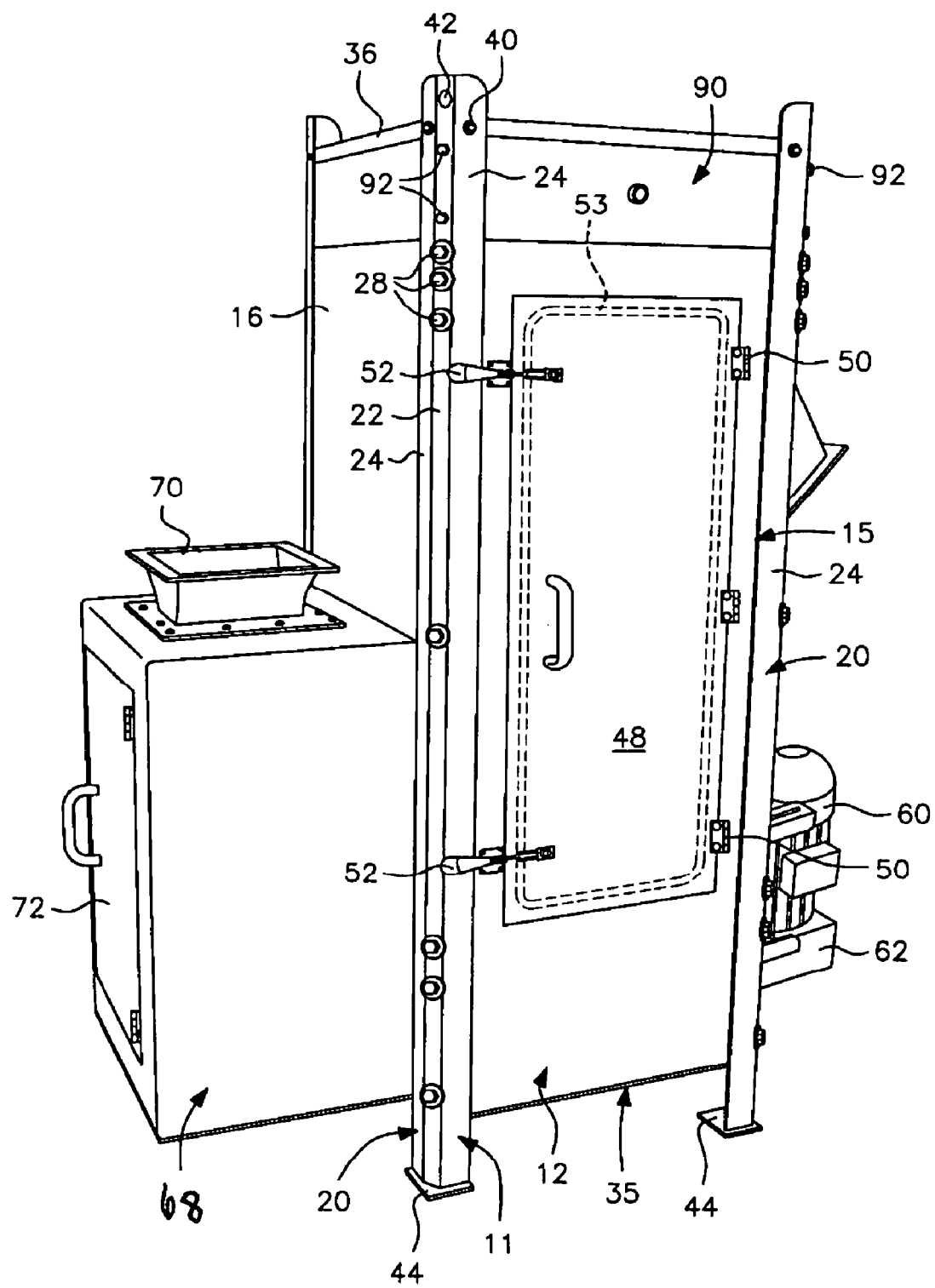
FIG. 1 is a front perspective view of one embodiment of a centrifugal pellet dryer with plastic walls constructed in accordance with the present invention.

Although preferred embodiments of the invention are explained in detail, it is to be understood that other embodiments are possible. Accordingly, it is not intended that the invention is to be limited in its scope to the details of constructions and arrangement of components set forth in the following description or illustrated in the drawings. The invention is capable of other embodiments and of being practiced or carried out in various ways. Also, in describing the preferred embodiments, specific terminology will be resorted to for the sake of clarity. It is to be understood that each specific term includes all technical equivalents which operate in a similar manner to accomplish a similar purpose.

Referring to FIGS. 1–5 of the drawings, one centrifugal pellet dryer in accordance with the present invention is generally designated by reference numeral 10. The dryer 10 includes a substantially rigid metal support framework, generally designated by reference numeral 11, having a metal generally square or rectangular top section, generally designated by reference numeral 90, and a corresponding metal bottom section, generally designated by reference numeral 35. The top section 90 and bottom section 35 are preferably made of rigid sheet metal panels welded together. The four corners of the metal top and bottom sections are interconnected by vertical metal corner frame members, generally designated by reference numeral 20, to form the substantially rigid metal support framework 11.

Figure 2:
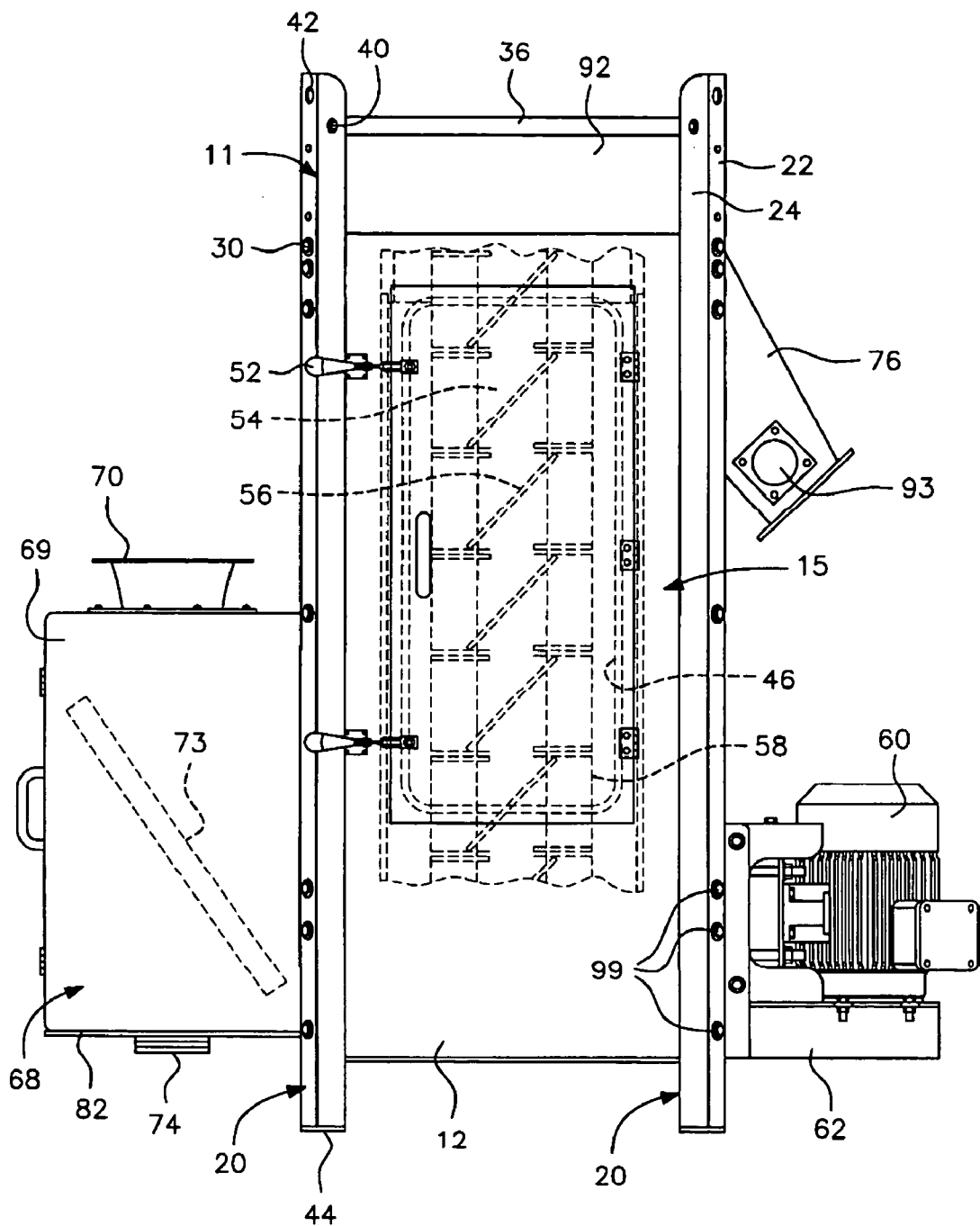
FIG. 2 is a front elevational view of the dryer of FIG. 1 in which certain internal components are illustrated by broken lines.
Figure 3:
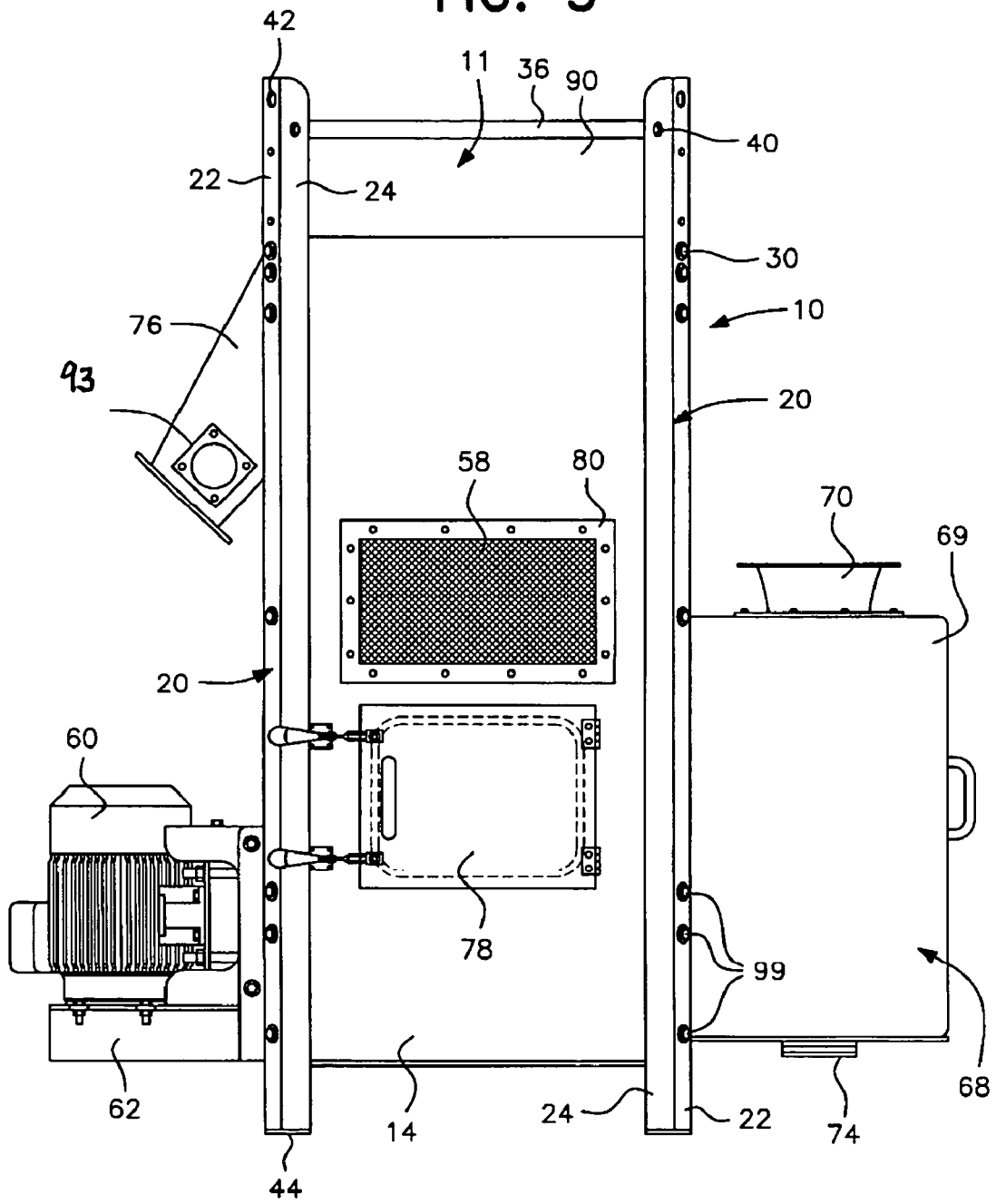
FIG. 3 is a rear elevational view of the centrifugal pellet dryer of FIG. 1.
Figure 4:
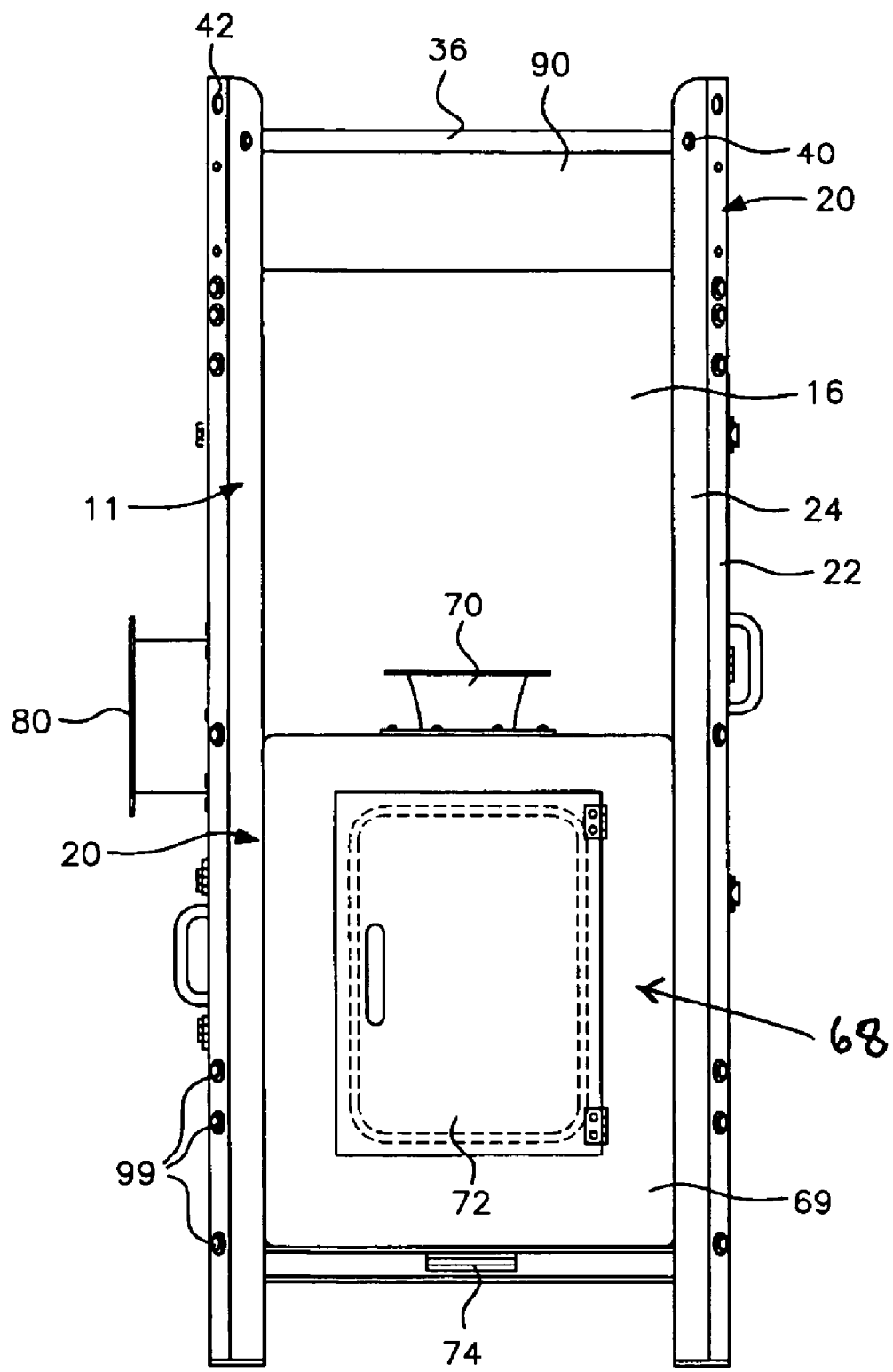
FIG. 4 is a left side elevational view of the dryer of FIGS. 1–3 illustrating the water and pellet slurry inlet to the dewaterer and an access door to the interior of the dewaterer.
Figure 5:
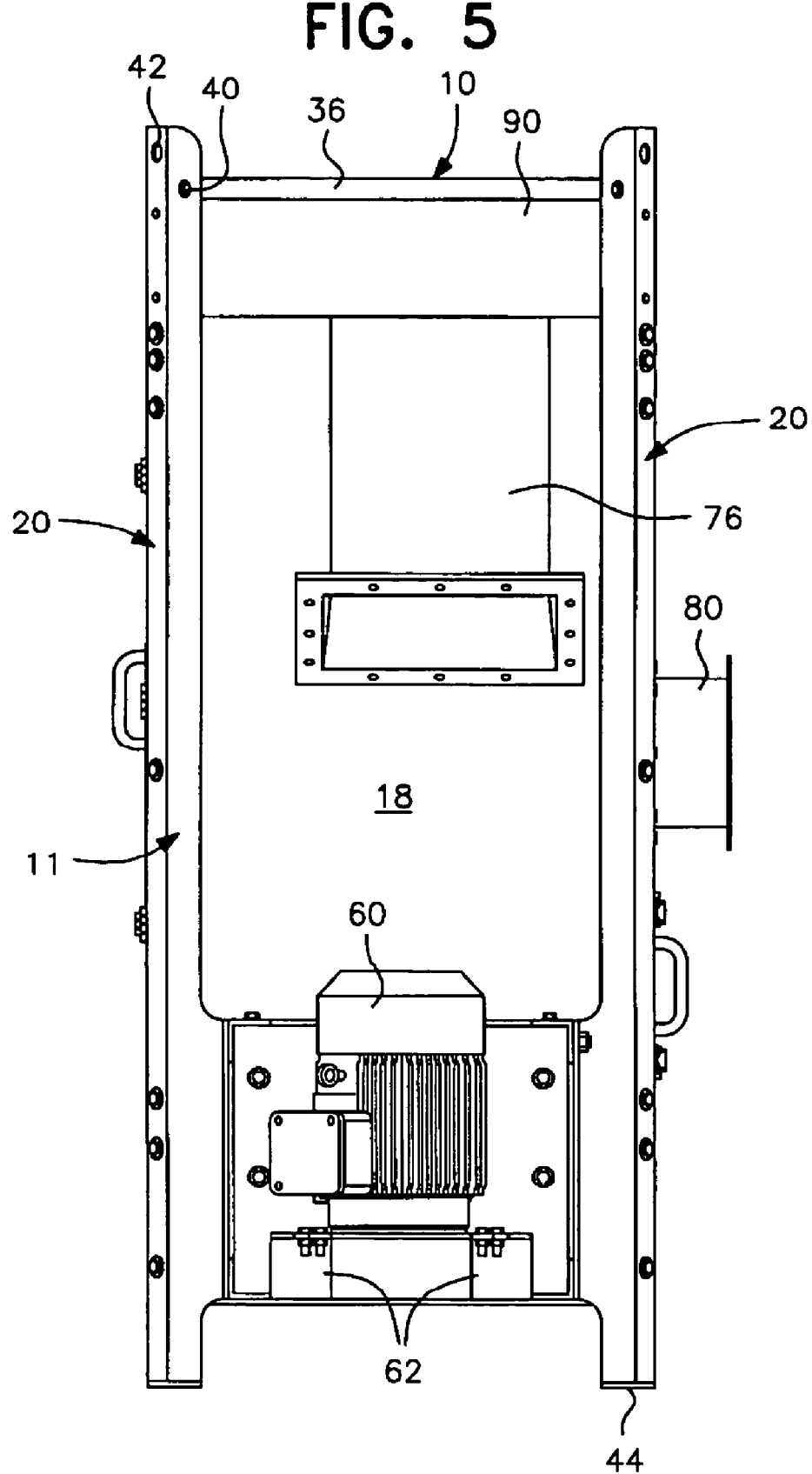
FIG. 5 is a right side elevational view of the dryer of FIGS. 1–3 illustrating the rotor drive motor and dry pellet outlet.

Supported in the framework 11 are four generally vertical wall panels including a front wall panel 12, illustrated in FIGS. 1 and 2, a rear wall panel 14 illustrated in FIG. 3, a left side wall panel 16 illustrated in FIG. 4 and a right side wall panel 18 as illustrated in FIG. 5. Each of the wall panels 12, 14, 16 and 18 are generally flat and rectangular, and opposing wall panels are generally in parallel relation to each other.

Each of the wall panels 12, 14, 16 and 18 are constructed of a substantially rigid plastic material. The adjacent vertical side edges of wall panels 12, 14, 16 and 18 are sealed together to form a substantially rigid and watertight wall assembly, generally designated by reference numeral 26, made of suitable plastic material. When fitted into the framework 11, the tops of the wall panels seal against the top section 90 and the bottoms seal against the bottom section 35 to form the dryer housing, generally designated by reference numeral 15.

Polypropylene is a preferred plastic material for the wall panels 12, 14, 16 and 18. It has been found that polypropylene sheeting approximately 1 inch thick for the wall panels of the wall assembly 26 provides the necessary noise attenuation and strength characteristics for the centrifugal pellet dryer 10 of the present invention. However, other suitable plastic materials could be used in constructing the plastic wall assembly 26, including fiber reinforced plastic materials, and other sheet thicknesses could be selected within the parameters of the present invention.

Figure 6:
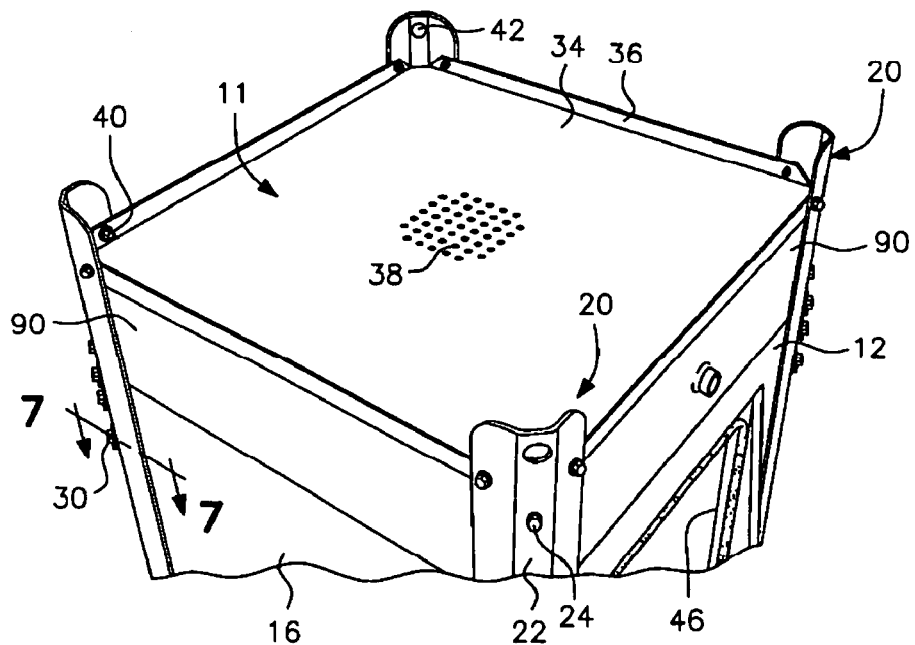
FIG. 6 is a partial top perspective view of the housing in accordance with the present invention illustrating the relationship of the top section and the vertical corner frame members of the metal support framework.
Figure 7:
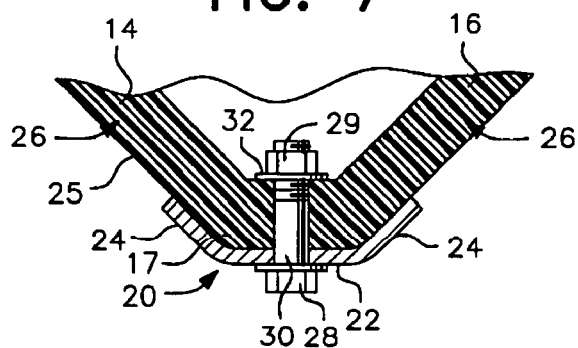
FIG. 7 is a transverse sectional view, on an enlarged scale, taken along section lines 7—7 on FIG. 6, illustrating the structure of a vertical corner frame member and the manner in which the plastic panels are connected to the corner frame members.
Figure 8:
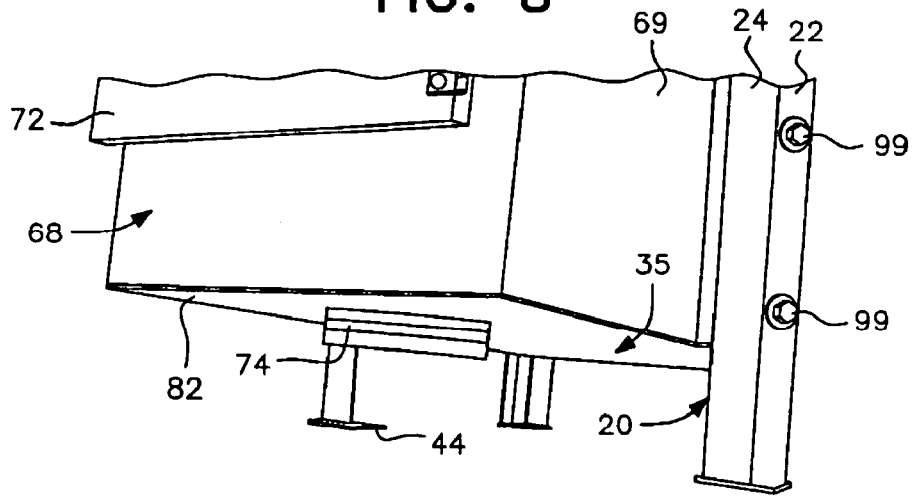
FIG. 8 is a fragmental perspective view of the lower end of the housing in accordance with the present invention illustrating the water outlet.

As illustrated in FIGS. 6 and 7, each corner frame member 20 includes a narrow vertical central panel 22 and a pair of narrow vertical side flanges 24 oriented in angular relation to the central panel 22. The flanges 24 are in general perpendicular relation to each other and engage the wall panels 12, 14, 16 and 18 near their edges. As shown in FIG. 7, the flanges 24 engage the external surfaces 25 of the edge portions of adjacent plastic left side wall panel 16 and rear wall panel 14 of the housing 15.

As also shown in FIG. 7, the side edges of adjacent wall panels 14 and 16 are angulated at 17 to abut each other and have holes to receive clamp bolts 30 which extend through the central panel 22 of the frame member 20. The head 28 of each bolt 30 engages the exterior of center panel 22 and a retaining nut 29 on the inner end of bolt 30 engages the interior of angulated edges 17 of the adjacent panels 14 and 16. A retaining washer 32 is positioned under the retaining nut 29 to clampingly secure the edges of adjacent panels 14 and 16 to frame member 20. If desired, a continuous inner frame member may be provided in lieu of the individual washers 32 in order to provide a more positive clamping action throughout the length of the vertical edges of the panels 12, 14, 16 and 18.

The metal top section 90 is bolted to the corner frame members 20 by bolts 92 in a similar manner to the wall panels. The top section 90 is preferably made of aluminum with its lower edges sealed to the top edges of the wall panels 12, 14, 16 and 18. Alternatively, the lower edges of the top section panel can overlie the top edges of plastic wall panels 12, 14, 16 and 18 with a watertight seal formed therebetween.

Figure 9:
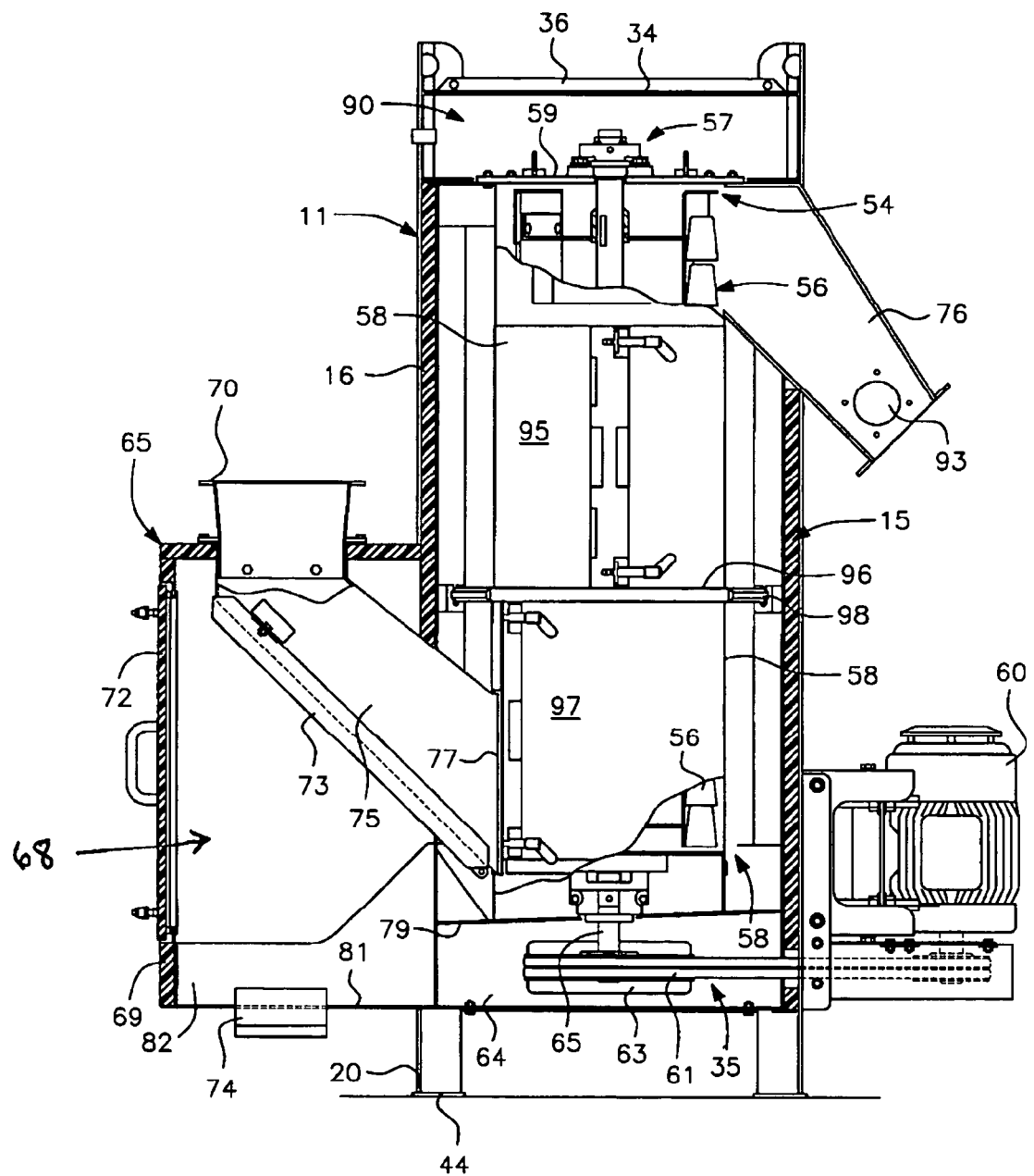
FIG. 9 is a schematic vertical sectional view of the dryer of FIGS. 1–3, illustrating the relationship of the operating components of the dryer, the housing and the dewaterer.
Figure 10:
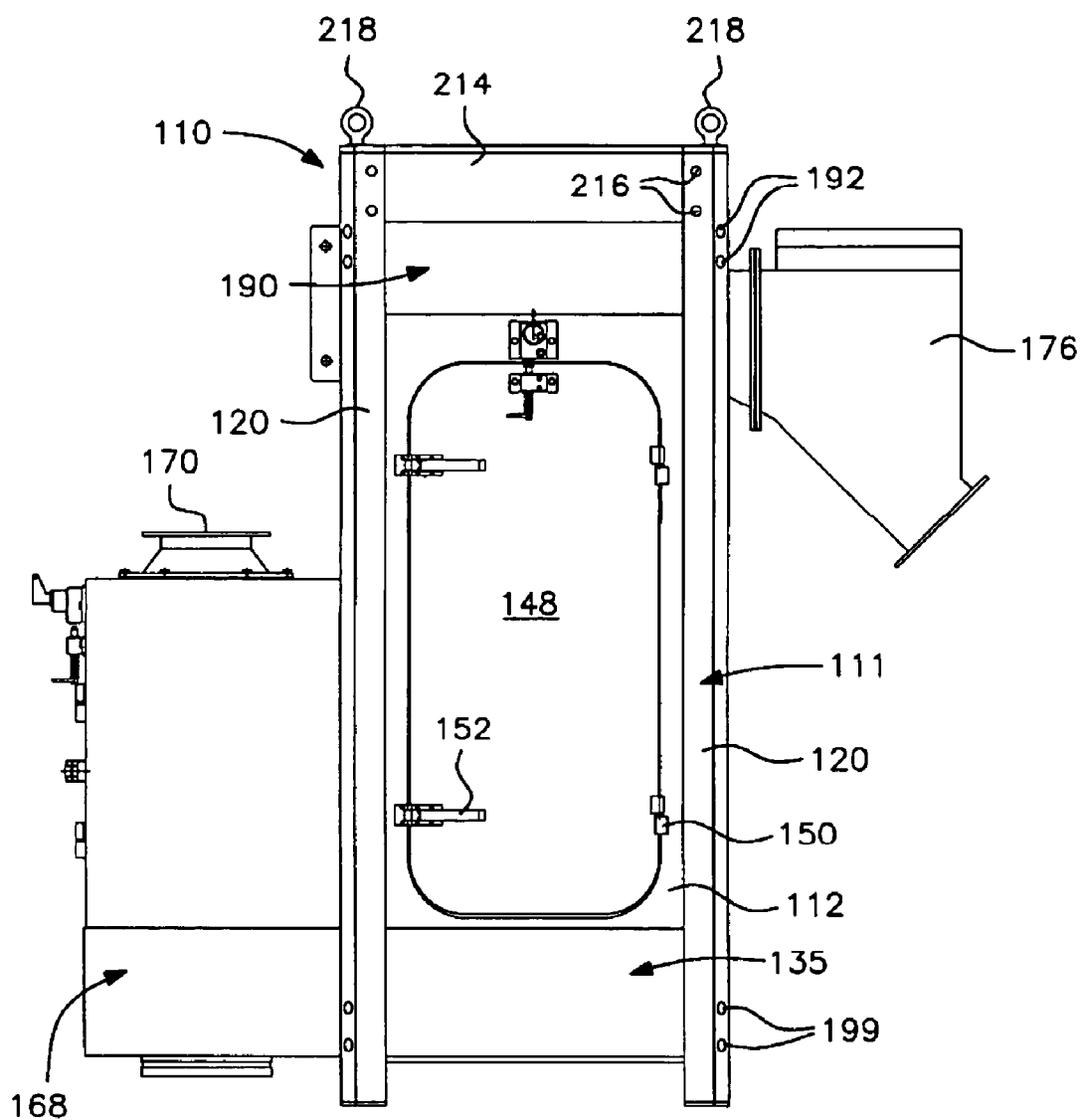
FIG. 10 is a front elevational view of another embodiment of a centrifugal pellet dryer with plastic side walls constructed in accordance with the present invention.

As shown in FIGS. 6 and 9, the top edges of top section 90 are closed by a top panel 34, also made of aluminum. The periphery of top panel 34 is seated to the top of the top section 90 to provide a rigid assembly. The corner frame members 20 extend above the top of the top section 90 as illustrated in FIGS. 1–5 and also extend above top panel 34 as illustrated in FIG. 6. As shown in FIG. 6, the top panel 34 includes an upwardly extending flange 36 around the periphery thereof and a central perforated area 38 to vent the interior of the housing upper end. The ends of the flanges 36 are secured to the flanges 24 of the corner frame members 20 by the use of screw threaded fasteners 40 or the like.

The top ends of each corner frame member 20 is provided with an opening 42 to provide points of attachment for a lift device such as a crane or similar equipment in order to lift the dryer and place it in a desired location. The lower ends of the corner frame members 20 extend below the bottom section 35 of the dryer 10, and each corner frame member 20 includes a bottom plate 44 to support the dryer on a supporting surface. The plate 44 may be provided with openings to receive an anchor device to secure the dryer to the supporting surface.

The bottom of plastic wall panels 12, 14, 16 and 18 extend outside the side walls of bottom section 35, and bolts 99 adjacent the bottom of vertical corner frame members 20 connect to side walls of the bottom section 35 as well as the bottom of the wall panels (see FIGS. 2, 3, 4 and 8). Appropriate sealing between the side walls of the bottom section 35 and the wall panels 12, 14, 16 and 18, if desired, forms a watertight housing 15. The bottom section 35 acts like a tub at the bottom of housing 15 to collect and direct the water removed from the pellets in the dryer.

The front wall 12 of the dryer 10 includes an enlarged vertically extending access opening 46 closed by a correspondingly shaped plastic closure door 48 made of the same plastic sheet material as the wall panels 12, 14, 16 and 18. The plastic panel door 48 has one edge thereof hinged to the front wall panel 12 by a plurality of hinges 50. The opposite edge of the door 48 is retained in closed position by latches 52 which can be easily latched and unlatched to enable the access door 48 to be opened and closed. A door seal 53 is provided peripherally of the door 48 to maintain the watertight integrity of the housing 15.

The operational components of the dryer 10 are positioned within the housing 15 and include the rotor 54 with inclined blades 56 on the periphery thereof which rotates within a stationary perforated cylindrical screen 58. The structure and operation of the rotor 54 in a drive chamber 64 at the bottom of housing 15 and screen 58 are similar to the centrifugal dryers disclosed in the aforementioned prior U.S. patents. The rotor 54 is driven by an electric motor 60 mounted exteriorly at the bottom area of side wall panel 18 by a laterally extending bracket structure 62 which adjustably supports the motor from the frame members 20 along opposite edges of the wall panel 18. The motor 60 includes a belt drive 61 on pulley 63 on the lower end of the rotor 54 in a drive chamber 64 at the bottom of housing 15. The bracket structure 62 for the motor includes adjustments to enable tension on the belt drive to be adjusted. The structure of the belt drive from the motor 60 to the lower end of a shaft 65 of the rotor 54 may be the same as disclosed in the aforementioned prior U.S. patents.

The upper end of the rotor 54 is guided and sealed by bearing structure generally designated by reference numeral 57. The bearing structure 57 is supported by plate 59 which is, in turn, supported by corner frame members 20. The plate 59 seals the upper end of the wall assembly.

The left side wall panel 16 includes a dewaterer, generally designated by reference numeral 68, in the form of a plastic housing 69 which is sealed to plastic wall panel 16. The housing 69 includes a metal slurry inlet 70, preferably made of stainless steel, in the top wall 71, a plastic access door 72 in an outer wall thereof, and an aluminum bottom section 82. The bottom section 82 is rigidly connected to the bottom section 35 of the dryer so that the dewaterer 68 is supported by the dryer bottom section 35 and hence framework 11. The plastic housing 69 including the three side walls and top wall are all preferably made from the same plastic sheet material as the wall panels 12, 14, 16 and 18.

The dewaterer 68 receives a slurry of water and pellets from an underwater pelletizer and includes an internal, slanted screen 73 which permits water in the slurry to pass downwardly through the screen to a discharge opening 74 in the bottom of the dewaterer 68. As illustrated in FIG. 9, the screen 73 is typically slanted at about 45°, but the angle can be varied as desired. Pellets in the slurry pass downwardly along the upper surface of the inclined screen 73 which forms the bottom of an inclined chute 75. The chute 75 conveys the pellets into an opening 77 at a lower area at the bottom end of the screen 58 (and rotor 54) to enable the rotor 54 and screen 58 to function in a manner disclosed in the aforementioned U.S. patents.

Water removed from the pellets by the action of the rotor 54 and the screen 58 flows down inside the wall assembly 26 (and outside the screen 58) toward the bottom section 35. As also illustrated in FIG. 9, an inside bottom panel 79 of bottom section 35 is sloped toward and spaced above the floor 81 of the dewaterer bottom section 82 so that the water passing through the screen 58 also flows into the bottom of dewaterer 68 and out through outlet 74. As such, outlet 74 is the only water outlet for the dryer 10. In a preferred embodiment the bottom section 35 of the support framework 11 and the bottom section 82 of the dewaterer are welded together as a one-piece unit.

Cut in the wall panel 18 of the housing is a downwardly slanted dried pellet outlet 76 which is rigidly mounted to top section 90 for support therefrom. The pellet outlet 76 communicates with the upper end of the rotor 54 and screen 58 of the dryer by which dried pellets exiting from the screen and rotor are discharged from the dryer. A conveying hose or duct work (not shown) is typically connected to the exit end of outlet 76 in order to convey the dried pellets away from the dryer to storage or further processing. A sight glass window 93 is preferably mounted on a side of outlet 76 in order for an operator to view the flow of material out of the pellet outlet.

The rear wall 14 of the housing 15 is provided with a plastic access door 78 and has hinges, latches and handle to provide access to the lower portion of the dryer components within the housing. Also, a large central flanged opening 80 is provided in the rear wall panel 14 above the access door 78 for connection to an exhaust fan and air duct (not shown) to provide air circulation through the housing 10. This structure provides inflow of air through the dried pellet discharge outlet 76 in countercurrent relation to pellets exiting the dryer.

The screen 58 typically can comprise multiple sections, such as upper section 95 and lower section 97, whose abutting edges are held in place by support ring 96. The ring 96 is supported by radially extending support members 98 connected to corner frame members 20 to support and stabilize the screen 58 as illustrated in FIG. 9, in a manner similar to that disclosed in aforementioned U.S. Pat. No. 6,138,375.

The plastic wall dryer of this invention is also modular. Using side wall panel 16 and the dewaterer 68 mounted therein as a reference, the other wall panels 12, 14 and 18 with related doors and components can be selectively shifted as specified by the user. For example, the top section 90 could be rotated 90° so that the pellet outlet 76 extends to the rear of the dryer 10. The right side wall panel 18 can become the rear wall, and the motor 60 with brackets 62 would also be mounted on the rear of the dryer. The rear panel 14 with door 78 and opening 80 might then be shifted to the front of the dryer, and the side wall panel 12 with the door 48 placed into the right side panel position. These side wall panels and related components can thus be moved to any of the three side locations not occupied by side wall panel 16 and dewaterer 68.

In operation, a slurry of water and pellets from the underwater pelletizer is fed to the dewaterer 68 through the flanged inlet 70 by means of a suitable conduit. The dewatering screen 73 permits passage of a large proportion of the water to exit through the outlet 74 at the bottom of the dewaterer 68. The water removed by operation of the rotor and screen assembly passes outside of screen 58 to the bottom of the housing 15 where it flows to the bottom of dewaterer 68 to also pass out through outlet 74.

The pellets are retained by the dewatering screen 73 and are discharged into the bottom of the cylindrical screen 58 and elevated by the rotor 54. The rotor 54 also imparts radial movement to the wet pellets for impact against the interior of the screen 58 so that the water or moisture on the pellets is discharged through the screen into the housing 15 for discharge from the bottom of the dryer to the bottom of dewaterer 68. As the pellets reach the upper end of the screen 58, the dried pellets exit into the dried pellet discharge 76 for conveyance through a duct work (not shown) connected to the flanged outlet 76.

Another embodiment of a centrifugal pellet dryer with plastic wall panels in accordance with the present invention is illustrated in FIGS. 10–14. The numerals designating the components in the embodiment of FIGS. 10–14 correspond to like numbered components in FIGS. 1–9, except the numerals for the former are preceded by the number "1" and are in the 100 series; new components may be numbered in the 200 series. Hence, the centrifugal pellet dryer of the FIGS. 10–14 embodiment is generally designated by reference numeral 110, and includes a substantially rigid metal support framework, generally designated by reference numeral 111. The framework 111 has a metal generally square or rectangular top section, generally designated by reference numeral 190, and a corresponding metal bottom section, generally designated by reference numeral 135. The four corners of the metal top and bottom sections are interconnected by vertical metal corner frame members, generally designated by reference numeral 120, to form the substantially rigid metal support framework 11.

The top section 190 includes a support plate 159 which supports the rotor 154 and related upper bearing assembly 232 and pulley 163. The plate 159 of top section 190 also supports the dried pellet outlet 176. Surrounding the rotor 154 is cylindrical screen 158 comprising screen sections 195 and 197 supported at their adjacent edges by support ring generally designated by reference numeral 196.

Four generally flat and rectangular wall panels constructed of substantially rigid plastic material 112, 114, 116 and 118 are supported in the support framework 111 in generally opposed parallel relation to each other in a manner to be described hereinafter. The metal top section 190 is bolted to the top of corner frame members 120 by bolts 192 or any other suitable fastening element. The metal bottom section 135 is also bolted to the corner frame members 112 by bolts 199 or other suitable fastening element to complete the rigid framework 111.

Figure 13:
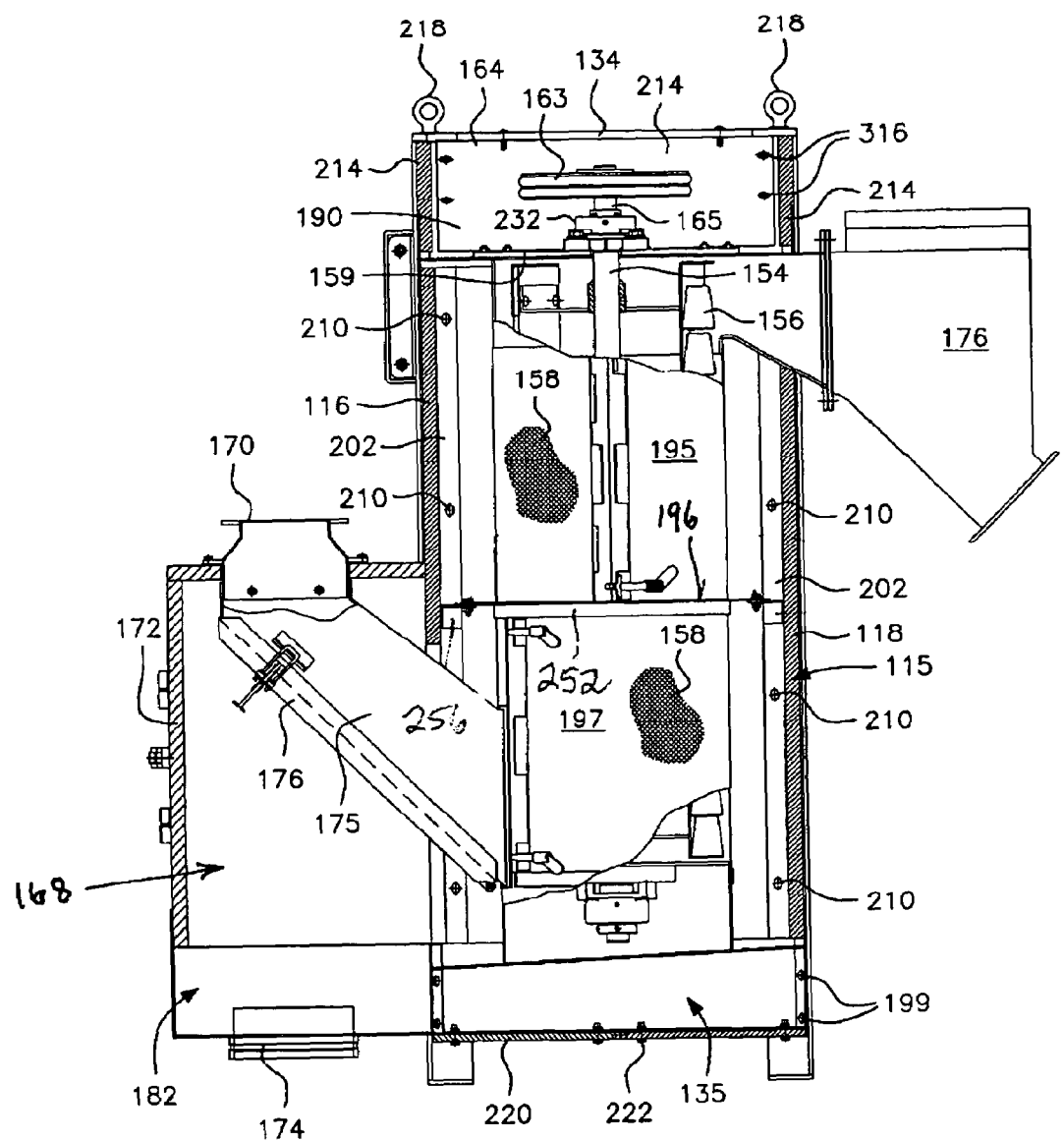
FIG. 13 is a schematic vertical sectional view of the dryer of FIG. 10 showing the relationship with the plastic panel side walls.
Figure 14:
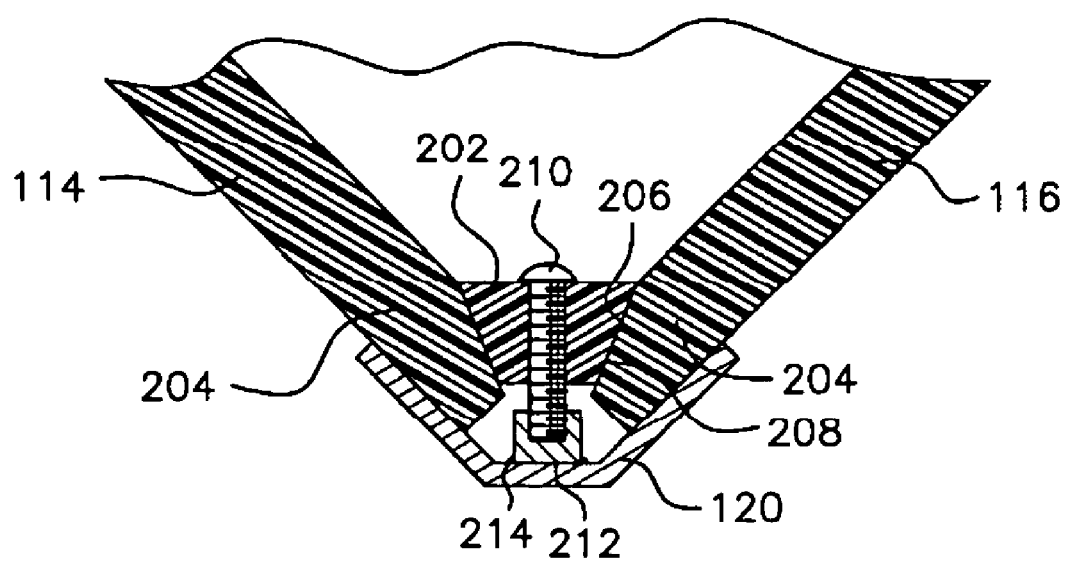
FIG. 14 is a transverse sectional view, on an enlarged scale, similar to FIG. 7, illustrating the structure for connecting and sealing the edges of the plastic panel side walls to the vertical corner frame members in the dryer of FIG. 10.

The wall panels 112, 114, 116 and 118 are supported in framework 111 by four corner sealing strips 202. Each corner sealing strip 202 is clamped against the adjacent side edges 204 of adjacent wall panels, such as panels 114 and 116 shown in FIG. 14, to support and seal the adjacent side edges 204 and form a sealed wall assembly 126 for dryer housing 115. The wall panel side edges 204 are preferably beveled, as at 206, to mate with the beveled side edges 208 of the corner sealing strips 202, in order to support and attain the desired seal between the adjacent side edges 204 and the corner sealing strips 202. The corner sealing strips 202 are clamped against adjacent side edges 204 by bolts 210 engaged with corresponding threaded tapped round bar elements 212 fixed in place on the inside surface of the corner frame members 120, as by welds 214 or the like. As shown in FIG. 13, there are preferably four vertically spaced bolts 210 to clamp each sealing strip 202 to the wall panel adjacent side edges 204.

Figure 11:
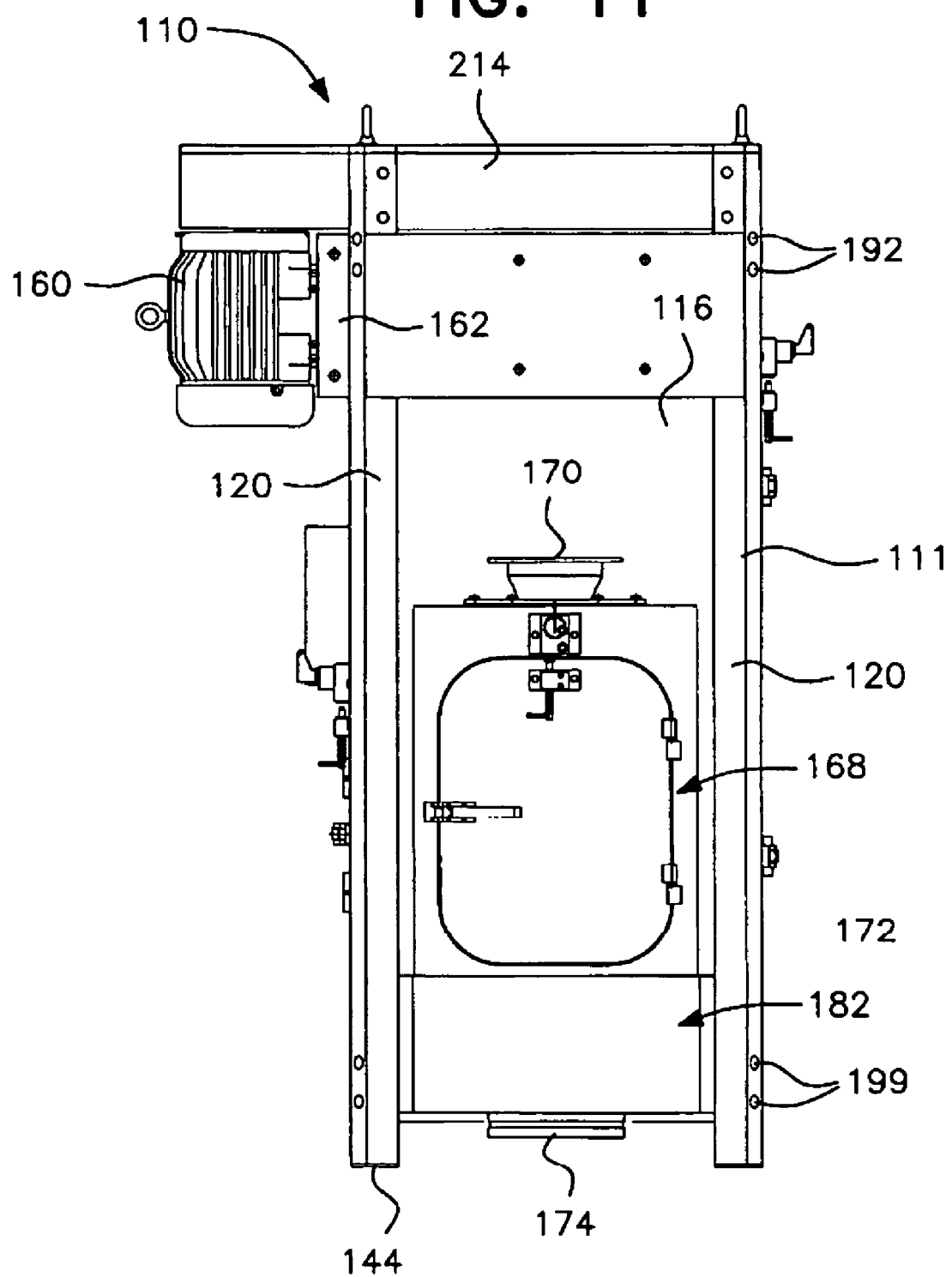
FIG. 11 is a left side elevational view of the dryer of FIG. 10.
Figure 12:
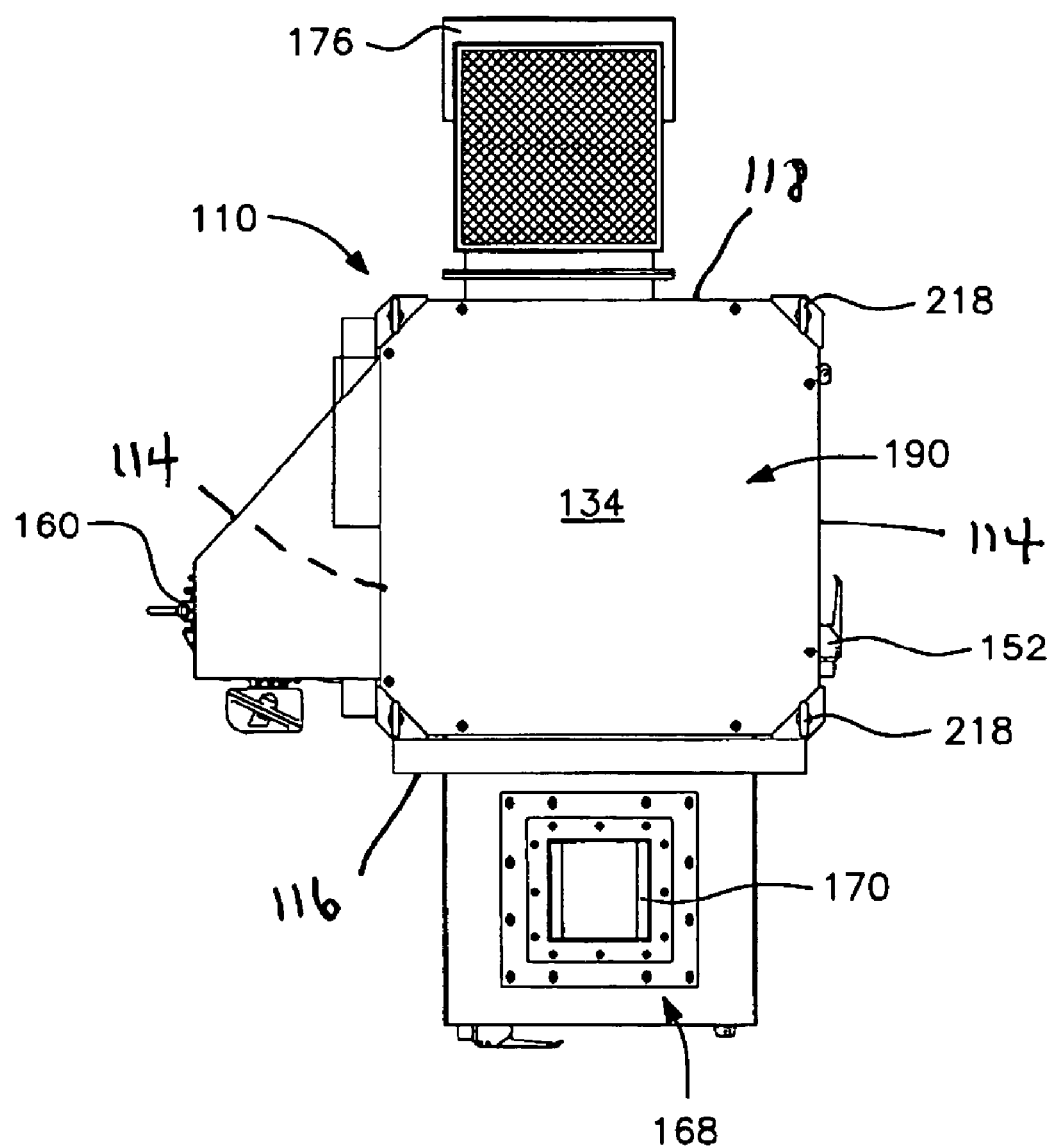
FIG. 12 is a top plan view of the dryer of FIG. 10.

As shown in FIGS. 11 and 12, the electric motor 160 is mounted exteriorly adjacent the top of the dryer 110 by bracket structure 162 at the back side of the dryer 110. The belt drive and belt tensioning device (not shown) and pulley 163 in drive chamber 164 thus drive the upper end of shaft 165 of rotor 154, in a manner similar to that disclosed in the aforementioned prior U.S. Pat. No. 6,237,244. Mounting the electric motor 160 and the related drive components at the top of the dryer 110 is preferred in order to keep water away from the motor and drive components during cleaning of the dryer or in the event of a dryer leak.

As shown in FIGS. 13 and 15, the support ring 196 for screen 158 is a generally flat plate 250 having inner and outer circular bands 251 and 252 which engage and support the adjacent circular edges of screen sections 195 and 197 in the manner described in the aforementioned U.S. Pat. No. 6,138,375. The plate 250 has corner sections 254, each of which is affixed to an angle piece 256 through suitable bolts or other fasteners 258. The angle pieces 256 are in turn bolted to their adjacent corner sealing strips 202 by suitable fasteners 260.

By attaching the support ring 196 directly to the plastic sealed wall assembly 126, the noise generated by the pellets impacting the screen 158 and vibration imparted thereto is significantly dampened. Further, the corner sections 254 preferably have an opening 255 to facilitate water passing down past the support ring 196.

In the FIGS. 10–14 embodiment, the drive chamber 164 is also noise insulated by plastic panel side walls 214, which are also preferably made from the same plastic sheet material as the wall panels 112, 114, 116 and 118. The side panels 214 are assembled onto the corner frame members 120 by bolts 216 or other suitable fasteners. Extending above the top panel 134 are a plurality of eyebolts 218 for lifting the dryer 110 by a suitable crane or other lifting equipment.

The outside bottom surface of the bottom section 135 is also preferably covered with a plastic sheet material 220, such as one-half inch thick polypropylene sheet material, and is affixed to the base of the bottom section 135 by appropriate bolts 222 or other suitable fasteners.

As with the FIGS. 1–9 embodiment, the plastic wall dryer of FIGS. 10–15 is also modular. With respect to the wall panel 116 and dewaterer 168, the wall panels 112, 114 and 118, together with their respective components, can be selectively shifted to any other wall location, as desired. The top section 190 would be rotated so that the dried pellet outlet 176 is positioned above wall panel 118. Similarly, the motor 160 and motor mounting bracket 162 would be shifted with wall panel 114.

Elevational movement and impact engagement of the pellets, the rotation of the rotor and the engagement of the rotor blades with the pellets produces sounds which may exceed acceptable levels for personnel in the vicinity of the dryer, especially when using a housing constructed of relatively large, flat sheet metal panels to form the housing. It has been surprisingly found that the noise level emanating from the dryer can be substantially reduced by using plastic panels of polypropylene or other similar plastic material for the dryer housing side walls and dewaterer walls even though the plastic panels are substantially rigid and provide adequate rigidity for the side walls of the dryer when mounted on the corner frame members in accordance with the present invention.

Testing was conducted with a prototype dryer having a frame structure and plastic housing walls similar to that illustrated in FIGS. 1–9. The testing was conducted within the confines of a noise absorption chamber using a hand held sound measurement device. The motor and drive unit were exposed. The pellet outlet, pellet recirculation piping and water supply piping were insulated at the time of testing. The testing yielded an average SPL reading of 79.25 decibels (Dba). Testing of a comparable Gala dryer having a conventional metal housing under substantially similar test conditions yielded an average SPL reading of 90 or more decibels (Dba). High decibel levels are often considered undesirable for individuals working in the vicinity of the dryer.

All of the plastic wall panels and other components are preferably constructed to seal in relation to each other without the use of silicones or other types of sealant, although sealants could be used as desired. Also, the various door gaskets are preferably an edge mounted resilient member of 0-ring configuration having a transverse section of circular configuration. In addition, all of the doors can be supported by internal hinges and operated by a routed or recessed handle structure to eliminate bolt-on projecting structures. Likewise, all door edges and opening edges could include a smoothly curved or radiused edge to eliminate sharp corner edges and reduce the number of parts used and reduce assembly time. All fasteners could have button heads or be covered to further reduce sharp edges or corners which could cause injury and to provide a streamlined external appearance.

An exhaust blower to circulate air through the dryer may be secured directly to flanged opening 80, or connected thereto by a duct. The blower could therefore be mounted anywhere on housing 15, or at a separate location, or even eliminated if the user has a central exhaust system to connect up to opening 80. Also, the dried pellet outlet 76 may be provided with a flanged end and be constructed with dimensions that enables unrestricted discharge of pellets. Top plate 34 could possibly be eliminated and top bearing 57 provided with a protective cover.

The foregoing is considered as illustrative only of the principles of the invention. Further, numerous modifications and changes will readily occur to those skilled in the art. For example, the housing 11 is shown as constructed with four vertical walls. Those skilled in the art will readily recognize that other wall configurations, e.g., five-sided, six-sided, etc., can be readily adapted for the present invention. Therefore, it is not desired to limit the invention to the exact construction and operation shown and described, and, accordingly, all suitable modifications and equivalents may be resorted to, falling within the scope of the invention.

What is claimed is:

1. In a centrifugal pellet dryer having a stationary, generally vertical cylindrical screen, said screen including a lower end receiving wet pellets and an upper end discharging dried pellets, a driven elevating rotor inside said screen, said rotor including spaced blades thereon for elevating pellets and impacting said pellets against an interior surface of the screen and causing moisture on the pellets to pass through the screen, and a housing enclosing said screen and rotor, said housing including an inlet supplying wet pellets to a lower end of the screen, a dried pellet discharge outlet, air flowing through said housing to assist in drying said pellets, and a water outlet in a bottom portion of the housing, the improvement comprising said housing having side walls constructed of a plurality of substantially flat panels of plastic sheet material sealed along adjacent edges to attenuate sounds produced by the rotor and pellets as the pellets are moved vertically and impacted against the interior of said screen.

2. In the centrifugal pellet dryer as claimed in claim 1, said plastic panels supported in a support framework having spaced parallel top and bottom sections interconnected by vertical corner frame members connecting to said plastic panels.

3. In the centrifugal pellet dryer as claimed in claim 2, one vertical wall of said housing including a water and pellet slurry dewaterer receiving said slurry from an underwater pelletizer to separate water from the pellets and discharge wet pellets to the lower end of said screen, said dried pellet outlet being in the opposite side wall and at an elevated position, walls of said dewaterer also made of said plastic sheet material.

4. In the centrifugal pellet dryer as claimed in claim 3, one vertical wall of the housing including an openable access door to enable access to said screen and rotor, said access door being constructed of plastic sheet material, and another vertical wall including an opening for outlet of pellet drying air, said air outlet being positioned below said dried pellet outlet and requiring pellet drying air to pass in through said dried pellet outlet and through the pellets being elevated and impacted against the interior of the screen before the pellets exit through the dried pellet outlet.

5. In the centrifugal pellet dryer as claimed in claim 4, said vertical wall having said dried pellet outlet therein including a rotor drive motor adjacent a lower end thereof, a laterally extending bracket supporting said motor and a driving connection between said motor and a lower end of said rotor.

6. In the centrifugal pellet dryer as claimed in claim 1, adjacent vertical edges of the said side wall panels being supported by vertical corner frame members, said corner frame members including flanges secured to said adjacent edges of adjacent panels.

7. In the centrifugal pellet dryer as claimed in claim 6, at least one pair of diagonally opposed frame members extending above said housing and including structure to facilitate a lift device being connected thereto to lift said centrifugal pellet dryer.

8. In the centrifugal pellet dryer as claimed in claim 6, said vertical corner frame members extending below said housing to support said housing above a supporting surface.

9. In the centrifugal pellet dryer as claimed in claim 3, said dewaterer including a projecting housing on a lower portion of said one vertical wall and said water and pellet slurry inlet being in a top wall of said dewaterer housing, said dewaterer housing including an outer wall having an access door therein to provide access to the interior of the dewaterer housing.

10. In the centrifugal pellet dryer as claimed in claim 2, said plurality of side wall panels being four and made of polypropylene.

11. A centrifugal pellet dryer which comprises:
a generally vertical cylindrical screen, said screen including a lower end receiving wet pellets and an upper end discharging dried pellets;
a driven elevating rotor inside said screen for elevating wet pellets and impacting said wet pellets against the interior surfaces of the screen and causing moisture on the pellets to pass through the screen; and
a housing enclosing said screen and rotor constructed of a plurality of substantially vertical flat side panels all made of plastic material and sealed along adjacent edges to form a sealed watertight plastic wall housing assembly, a top section and a bottom section sealed to said plastic wall housing assembly, said housing including an inlet supplying wet pellets to a lower end of the screen, a dried pellet discharge outlet adjacent the top of the screen, and a water outlet for water to exit adjacent a bottom portion of the housing.

12. The centrifugal pellet dryer as claimed in claim 11, wherein said vertical panels are made of the same plastic sheet material approximately one inch thick.

13. The centrifugal pellet dryer as claimed in claim 11, wherein a front wall of said sealed plastic housing includes an access opening and a plastic access door sealed over said opening when said door is in a closed position and enabling access to said screen and rotor when said door is in an opened position.

14. The centrifugal pellet dryer as claimed in claim 11, wherein an air flows through said housing entering through said dried pellet discharge outlet and exiting through an opening in said sealed plastic wall housing assembly spaced below said dried pellet discharge outlet.

15. The centrifugal pellet dryer as claimed in claim 11, further comprising a water and pellet slurry dewaterer receiving slurry from an underwater pelletizer to separate water from the pellets and discharge wet pellets to the lower end of said screen, said dewaterer having walls made of a plastic material.

16. The centrifugal pellet dryer as claimed in claim 11, wherein said plastic housing reduces an average noise level at a distance of about 36 inches from said dryer to below about 80 decibels.

17. In the centrifugal pellet dryer as claimed in claim 1, said housing constructed of plastic sheet material reducing an average noise level at a distance of about 36 inches from said dryer to below about 80 decibels.

18. A centrifugal pellet dryer which comprises:
a rigid support framework including rectangular top and bottom sections interconnected by vertical corner frame members;
a plurality of vertical plastic wall panels supported in said framework and sealed along adjacent side edges and with said top and bottom sections to form a sealed watertight housing assembly;

a generally vertical cylindrical screen positioned in said housing assembly for receiving wet pellets at a lower end and for discharging dried pellets at an upper end;

a driven elevating rotor inside said screen for elevating wet pellets and impacting said wet pellets against interior surfaces of said screen and causing moisture on the pellets to pass through the screen; and said housing assembly including an inlet supplying wet pellets to a lower end of the screen and a dried pellet discharge outlet adjacent the top of the screen.

19. The centrifugal pellet dryer as claimed in claim 18, wherein said vertical plastic wall panels are supported and sealed along adjacent side edges by corner sealing strips clamped against said adjacent side edges.

20. The centrifugal pellet dryer as claimed in claim 19, wherein said corner sealing strips and said adjacent side edges have mating beveled surfaces.

21. The centrifugal pellet dryer as claimed in claim 20, wherein said corner sealing strips are clamped by bolts connecting said sealing strips to vertically spaced connectors mounted on an inside surface of said vertical corner frame members.

22. The centrifugal pellet dryer as claimed in claim 19, wherein said vertical cylindrical screen includes adjacent sections connected and supported by a support ring rigidly connected to said corner sealing strips to dampen noise from said screen.

23. The centrifugal pellet dryer as claimed in claim 18, wherein said vertical plastic wall panels are modular and can be selectively positioned on any side of the dryer.

* * * * *